Sept. 7, 1948.　　　　C. S. KELLEY　　　　2,448,601
HYDROCARBON ALKYLATION PROCESS
Filed March 4, 1946
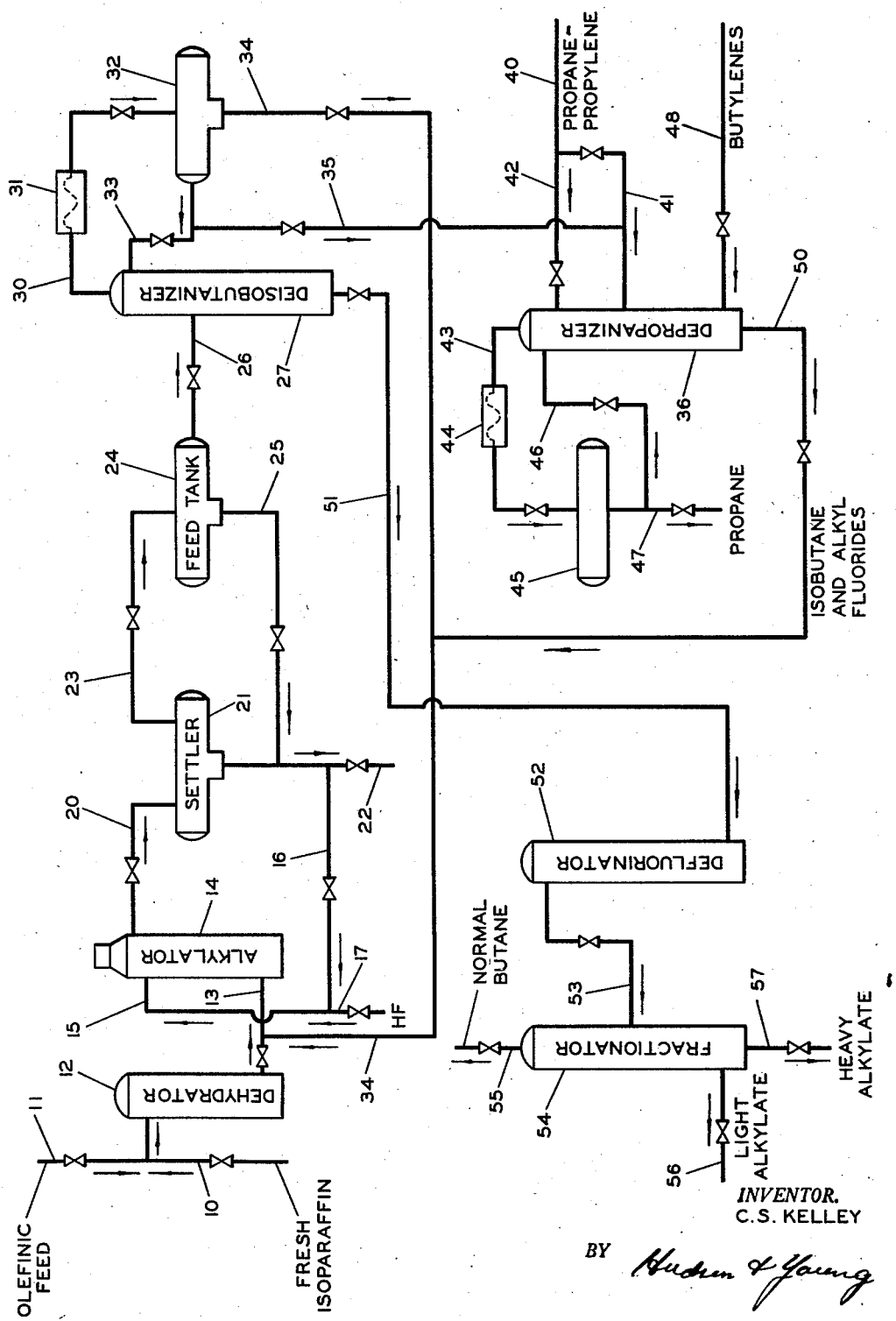
INVENTOR.
C. S. KELLEY
BY Hudson & Young
ATTORNEYS Patented Sept. 7, 1948

2,448,601

UNITED STATES PATENT OFFICE 2,448,601

HYDROCARBON ALKYLATION PROCESS

Carl S. Kelley, Bartlesville, Okla., assignor to Phillips Petroleum Company, a corporation of Delaware Application March 4, 1946, Serial No. 651,963

6 Claims. (Cl. 260—683.4)

This invention relates to an improved process for the reaction of a low-boiling isoparaffin with an alkylating reactant in the presence of a hydrogen fluoride alkylation catalyst to produce paraffin hydrocarbons of higher molecular weight. In a preferred embodiment it is concerned with a combination of related and cooperative steps whereby the process may be operated more efficiently. In another preferred embodiment it relates to the introduction of propylene into such an alkylation process without concomitant introduction of accompanying propane into the alkylation reactor.

The reaction of a low-boiling isoparaffin with an olefin, or other alkylating reactant, such as an alkyl halide, an alcohol, or the like, in the presence of liquid hydrofluoric acid as a catalyst has found wide use as a method of producing paraffin hydrocarbons boiling in the motor fuel range and having highly desirable characteristics for use as ingredients of premium motor fuels. Hydrogen fluoride is slightly soluble in paraffin hydrocarbons and, as a result, the hydrocarbon effluents of such an alkylation process, after physical separation of the bulk of the hydrofluoric acid catalyst, contain a small amount of dissolved hydrogen fluoride. This hydrogen fluoride is present in an amount between about 0.2 and about 5 per cent by weight of the hydrocarbon effluents. If such hydrocarbon effluents are partially in vapor phase the vapors will likewise contain similar small amounts of hydrogen fluoride. In most commercial plants wherein such a process is practiced, it is a preferred procedure to pass such hydrocarbon effluents directly to a fractional distillation column wherein such accompanying hydrogen fluoride is substantially completely removed as a constituent of a low-boiling fraction. As disclosed in Frey 2,322,800, issued June 29, 1943, hydrogen fluoride forms minimum-boiling azeotropic mixtures with low-boiling paraffin hydrocarbons, such propane and either of the butanes. Although the overhead product from such a distillation column generally contains a somewhat higher amount of paraffin hydrocarbon than is theoretically necessary to form such an azeotropic mixture, such a distillation is based upon the characteristics of this azeotropic mixture and such a column is generally referred to as an "azeo tower." The kettle product from such an azeo tower contains substantially all of the isobutane and higher-boiling paraffin hydrocarbons and is substantially free from free hydrogen fluoride. This mixture, either with or without a treatment to remove organic fluorine compounds, is passed to subsequent fractional distillation columns, the first of which is generally a deisobutanizer for removing, for recycling to the alkyltion step, unreacted isobutane. In those instances where propane has been introduced into the process as a contaminant or has been produced in the process, as is often the case with certain alkylating reactants, a portion of the isobutane stream is passed to a depropanizer which removes propane and maintains its concentration in the system at a satisfactorily low value.

I have now found that I can effect a somewhat simpler operation by eliminating the so-called "azeo tower" and passing hydrocarbon effluents of such an alkylation reaction directly to a deisobutanizer. In this way the bulk of the dissolved or entrained hydrogen fluoride is returned directly to the alkylation zone along with the recycle isobutane. The portion of the recycle isobutane which is passed to a depropanizer for removal of propane also contains dissolved hydrogen fluoride and it is a feature of my invention that the propane which is removed from such a material is maintained free from hydrogen fluoride by addition of sufficient low-boiling olefin hydrocarbon material to react substantially completely with the free hydrogen fluoride. In a modification of my invention which is particularly efficient, this olefinic material added to the depropanizer is a propane-propylene stream such as is commonly available in many refineries. The propylene in such a stream reacts with hydrogen fluoride to form propyl fluoride and the accompanying propane is removed as an overhead product together with propane which is in the main portion of the charge to the depropanizing column. In this way propylene is introduced as a reactant without the undesired results coming from accompanying propane and without the somewhat expensive procedures which would otherwise be necessary for separating propane from propylene.

It is an object of my invention to improve the operation of a process for reacting a low-boiling isoparaffin with an alkylating reactant.

It is another object of my invention to introduce propylene into an alkylation system without introducing into the alkylation zone a large amount of accompanying propane.

Still another object of my invention is to remove propane from an alkylation process wherein hydrogen fluoride is employed as a catalyst without removing hydrogen fluoride from the system at the same time.

Further objects and advantages of my invention will become apparent, to one skilled in the art, from the accompanying disclosure and discussion.

My invention will be practiced primarily in connection with the alkylation of isobutane with low-boiling olefins, such as butylenes and/or amylenes. However, in many cases it will be possible to apply the features of my invention to the reaction of other low-boiling isoparaffins, particularly isopentane, and to apply the features of the invention when other alkylating reactants are employed, such as higher-boiling olefin hydrocarbons whether those are produced by polymerization or are produced by other means, such as cracking or dehydrogenation, and also when other alkylating reactants such as alkyl halides, alcohols and similar alkyl compounds are used.

My invention will now be further described and discussed in connection with the accompanying drawing which forms a part of this application and which shows diagrammatically, by means of a flow sheet, an arrangement of apparatus suitable for use in practicing a preferred embodiment of my invention.

Referring now to the drawing, a paraffinic hydrocarbon stream having a high content of isoparaffin to be alkylated is introduced through line 10 and a stream comprising olefins to be reacted therewith is introduced through line 11. In practice material entering through line 10 will comprise 90 to 98 per cent of a low-boiling isoparaffin, such as isobutane and/or isopentane. The stream added through line 11 can be a butane-butene mixture, such as is often available in a refinery from effluents of a cracking operation. In some instances it may also contain amylenes and/or some propylene, although, as is evident from the present disclosure, when it is desired to react propylene this will be added to the system at a different point, as will be more fully discussed hereinafter. When olefinic polymers are available for reaction with a low-boiling isoparaffin, they may also be included in the feed passing through line 11 or in some instances may constitute the sole or main part of the olefins. Since most of these streams will contain some dissolved water they are combined and passed through dehydrator 12, which contains a suitable dehydrating agent such as alumina, bauxite, silica gel, calcium chloride, or the like. The dehydrated effluents pass through line 13, together with recycle isoparaffin returned through line 34, to alkylator 14 wherein they are intimately admixed with a hydrofluoric acid catalyst. This catalyst is introduced to alkylator 14 through line 15 and in commercial operations will comprise a major portion of recycled catalyst, which is returned to the process through line 16, and fresh hydrofluoric acid introduced through line 17. The reactants are treated under alkylation conditions well known to the art, such as a reaction time of about 5 to about 20 minutes, a ratio of hydrocarbons to hydrofluoric acid between about 2:1 and 1:2, a reaction temperature between about 70 and about 120° F., and a pressure sufficient to maintain the reactants substantially entirely in liquid phase.

The physical mixture of hydrofluoric acid catalyst and hydrocarbons, containing unreacted paraffin hydrocarbons and products of the alkylation reactions, is passed from alkylator 14 through line 20 to settler 21, which is usually maintained at about the same temperature and pressures as alkylator 14. In this settler liquid hydrofluoric acid settles as a heavy liquid phase leaving a hydrocarbon phase which is substantially free from hydrogen fluoride, except for that material which is dissolved in the hydrocarbons or otherwise entrained therein, in an amount between about 0.2 and about 5 per cent thereof. The hydrofluoric acid phase is withdrawn through line 16 and a major portion of it is recycled as previously discussed. Since this material tends to have accumulated in it small amounts of water and various organic impurities of high molecular weight, a portion is generally discharged, either continuously or from time to time, through line 22 for such treatment as may be desired. A hydrocarbon phase, generally substantially entirely liquid is withdrawn from the upper portion of settler 21 through line 23 and passed to a deisobutanizer feed tank 24. This feed tank acts primarily as a surge tank, or accumulator, so that a steady flow of material to deisobutanizer 27 can be effected even though variations may be experienced in the operations of the equipment just discussed. In some instances a small amount of hydrofluoric acid may settle out in the bottom of this feed tank, in which case it can be returned to the alkylation system by being passed through line 25 to line 16.

The hydrocarbon mixture, containing substantially only dissolved hydrofluoric acid, is passed from feed tank 24 through line 26 to deisobutanizer 27. This can be any suitable type of conventional fractional distillation column so designed that it will resist the corrosive action of hydrofluoric acid and will produce as an overhead product substantially all of the isobutane and lower-boiling hydrocarbons together with free hydrogen fluoride contained in the charge entering through line 26. Although hydrogen fluoride has a higher boiling point than isobutane it forms a minimum-boiling azeotropic mixture with low-boiling paraffin hydrocarbons, as disclosed in Frey 2,322,800, issued June 29, 1943, and the small amount which is present in the feed to the deisobutanizer will readily pass overhead along with the unreacted isobutane and any propane which may be present. This low-boiling fraction is removed through line 30, cooled and condensed in condenser 31, and passed to reflux accumulator 32. A substantial portion is withdrawn through line 33 and returned to the top of deisobutanizer 27 as liquid reflux. Since the hydrocarbon material passing through line 26 is a saturated solution of hydrogen fluoride in hydrocarbons, and since a substantial portion of this hydrocarbon material is too high boiling to be present in the overhead fraction, there will be present more than sufficient hydrogen fluoride to form a saturated solution, and as a result, some separated liquid hydrogen fluoride will settle out in the bottom of reflux accumulator 32. This material, together with a substantial portion of the isobutane, is removed from the bottom of accumulator 32 through line 34 and returned to line 13 and alkylator 14 for reintroduction into the reaction zone. This stream will comprise the desired recycle isobutane stream.

In commercial operations it is substantially inevitable that some propane and lighter material will be present in one or more of the streams added through lines 10 and/or 11. Unless some provision is made for removing this material from the system, it will tend to accumulate to an undesirably high concentration and reduce the efficiency of the plant, and may necessitate an increase in the operation pressure. A portion of the isobutane fraction, therefore, is withdrawn from line 33 through line 35 and passed to depropanizer 36. Depropanizer 36 is any desired type of fractional distillation column designed to withstand the corrosive action of hydrogen fluoride and to effect a separation between propane and lighter hydrocarbons and isobutane. However, since most of the hydrogen fluoride will tend to be contained in the overhead product, an olefin-containing material is added to depropanizer 36 through line 40. In accordance with a preferred embodiment of this invention, this olefin-containing material is a propane-propylene mixture. When this fraction is substantially free from $C_2$ and lighter hydrocarbons it may be added at an intermediate part of depropanizer 36, such as by being added through line 41 directly to the feed line 35. However, in order to prevent contact between any ethylene which may be present and any large proportion of the hydrogen fluoride entering depropanizer 36 through line 35, it is preferred to add this material to a higher portion of the depropanizer if it contains any appreciable amount of ethylene. Such an addition may be made through line 42. This feature is more thoroughly discussed and is claimed in my copending application Serial No. 736,177, filed March 21, 1947. A low-boiling fraction substantially free from hydrogen fluoride, isobutane, and alkyl fluorides, and containing a substantial proportion of propane and lighter hydrocarbons introduced to depropanizer 36 through lines 35 and 40, is removed through line 43, cooler and condenser 44, and passed to reflux accumulator 45. A portion of this material is returned to the top of depropanizer 36 through line 46 as a liquid reflux and the excess is discharged from the system through line 47. In many instances the material added through line 40 will contain more propylene than is molecularly equivalent to the hydrogen fluoride concomitantly entering the depropanizer through line 35, to insure that the overhead product is essentially free from free hydrogen fluoride. In such an instance the overhead product may contain some free propylene.

The kettle product of depropanizer 36 comprises primarily isobutane and propyl fluoride. This material is withdrawn through line 50 and passed to lines 34 and 13 for introduction into alkylator 14. In some instances, particularly when ethylene is present in the stream added through lines 40 and 42, alkyl fluorides present in the kettle or lower portion of depropanizer 36 will tend to decompose and release free hydrogen fluoride. In order to inhibit such an undesired reaction it may be desirable to add olefins, particularly butylenes, to a low portion of depropanizer 36, as through line 48.

The kettle product from deisobutanizer 27 comprises the higher-boiling paraffin hydrocarbons produced in alkylator 14 and most of the normal butane which may be present in the effluents of the reaction zone. This material is passed from the kettle of deisobutanizer 27 through line 51 to defluorinator 52, wherein it is treated to remove any fluorine compounds which may be contained therein. This may be satisfactorily effected by contacting the stream with a material such as alumina, or bauxite, as disclosed in Frey 2,347,945, issued May 2, 1944, at about the same temperature as is used in the kettle of deisobutanizer 27, as disclosed in Frey 2,403,714, issued July 9, 1946. In the event that bauxite is used and the conditions are such that there is danger of silicon tetrafluoride being present in the effluents of defluorinator 52, lime may be included as a part of the contact mass. A substantially fluorine-free effluent is passed through line 53 to suitable separating means illustrated by fractionator 54. Normal butane is discharged from the system through line 55, a light alkylate fraction is recovered through line 56 as a product of the process, and a heavy alkylate fraction is recovered through line 57, also as a product of the process. These materials may be subjected to any desired subsequent treatment and may be blended with other motor fuel ingredients to produce a premium motor fuel as is well known in the art.

The procedure just disclosed has an advantage of removing propane from a conventional alkylation system, insuring that the propane so removed is not contaminated with any large amount of hydrogen fluoride, and producing this result with a minimum of fractional distillation columns. In most commercial alkylation plants employing hydrogen fluoride as a catalyst, it is conventional to have one fractional distillation column, preferably fed from feed tank 24, whose primary function is to remove substantially all of the dissolved hydrogen fluoride from the effluents of the reaction zone without, at the same time, making any separation between hydrocarbon components, and the present invention permits elimination of such a distillation column. A further advantage of the present invention is that propylene can be added to the alkylation system as a reactant without first freeing it from accompanying propane and at the same time without charging propane in any large quantity to the alkylation zone. It will be appreciated, however, that my invention can be successfully and advantageously practiced by adding any suitable olefin reactant through line 40 to depropanizer 36. However, if such a stream should contain large amounts of other inert paraffin hydrocarbons, such as normal butane, one of the advantageous features of my invention will not be realized, since such an inert material will be contained in the stream removed through line 50 and introduced into the reaction zone and will not be eliminated from the system through line 47 as is the propane, and any ethane or lighter hydrocarbons, which may accompany propylene introduced through line 40. However, it is possible to operate successfully when an isobutane-olefin stream substantially free from normal butane is introduced through line 40, when an isopentane-olefin stream substantially free from normal butane and/or normal pentane is introduced through line 40, or when other substantially inert-free olefin streams are available and so introduced.

It will be appreciated that this drawing is diagrammatic and that many conventional pieces of equipment such as pumps, heat exchangers, reboilers, extra reaction zones, extra dehydrating equipment, defluorinating equipment, fractional distillation columns, and the like, have not been shown. However, such flow sheet is familiar to those skilled in the art and furnishes a sufficient guide for one so skilled to practice the invention successfully.

The following examples illustrate specific embodiments of my invention. It is to be understood, however, that such examples should not be interpreted as adding unnecessary limitations to the invention.

*Example I*

The following illustrates the operation of one modification of my invention, reference being made to the accompanying drawing for identification of the various streams and units of equipment.

Isobutane, introduced through line 10, is reacted with olefins contained in a butene-amylene feed stream produced by other refinery operations, introduced through line 11. The operation is as has been discussed in connection with the drawing, and the compositions and quantities of the various streams are as indicated in the following table.

| Line | 10 | 11 | 26 | 51 | 34 | 35 | 41 | 47 | 50 |
|---|---|---|---|---|---|---|---|---|---|
| Vol., Bbls./day | 1,580 | 3,000 | 12,163 | 4,225 | 4,716 | 3,202 | 1,100 | 1,025 | 3,262 |
| Composition, percent liq. vol.: | | | | | | | | | |
| HF | | | 0.4 | | 0.6 | 0.5 | | | |
| Alkyl Fluoride | | | | | | | | | 1.9 |
| Propylene | | | | | | | 18.2 | 4.9 | 2.7 |
| Propane | | 0.8 | 3.7 | | 5.6 | 5.6 | 81.8 | 91.2 | 4.8 |
| Isobutane | 91.8 | 8.3 | 49.5 | 3.2 | 74.3 | 74.3 | | 4.9 | 71.4 |
| N-Butane | 8.2 | 26.7 | 20.4 | 22.0 | 19.5 | 19.6 | | | 19.2 |
| Butylenes | | 23.9 | | | | | | | |
| Amylenes | | 13.3 | | | | | | | |
| Pentanes and Heavier | | 27.0 | 26.0 | 74.8 | | | | | |

Example II

The following illustrates the operation of another embodiment of my invention, reference being made to the accompanying drawing for identification of various streams and units of equipment. In this instance appreciable amounts of ethane and ethylene are contained in the olefin-containing mixture added to the depropanizer.

Isobutane and olefins are reacted as in Example I. A portion of the deisobutanizer overhead is passed to depropanizer 36, through line 35. Depropanizer 36 is a conventional fractional distillation column, equipped with bubble trays and heated at the bottom and cooled at the top by a reflux stream returned through line 46 to the top tray. A propane-propylene stream, containing some ethane and ethylene, is introduced through lines 40 and 42 to the top tray. The compositions of the pertinent streams, and of the liquids on each of the top five trays of the depropanizer, are shown in the following table.

| Composition | Line 35 | Line 42 | Line 43 | Line 50 | Liquid on Trays | | | | |
|---|---|---|---|---|---|---|---|---|---|
| | | | | | Top | Top-1 | Top-2 | Top-3 | Top-4 |
| Mol Per Cent: | | | | | | | | | |
| HF | 2.4 | | | | | | | | |
| Propyl Fluoride | | | 0.1 | 2.6 | 0.03 | 0.08 | 0.15 | 0.3 | 0.6 |
| Methane | | 1.6 | 1.3 | | 0.1 | 0.11 | | | |
| Ethylene | | 2.2 | 1.8 | | 0.5 | 0.18 | 0.05 | 0.012 | 0.003 |
| Ethane | | 17.4 | 13.8 | | 7.1 | 2.8 | 1.1 | 0.37 | 0.12 |
| Propylene | | 17.5 | 5.3 | 0.1 | 6.2 | 5.6 | 4.8 | 4.0 | 3.1 |
| Propane | 10.7 | 59.7 | 72.7 | 3.5 | 77.8 | 77.4 | 72.3 | 63.6 | 51.7 |
| Isobutane | 66.5 | 1.6 | 5.0 | 71.4 | 8.1 | 13.4 | 20.5 | 29.5 | 40.6 |
| N-Butane and Heavier | 20.4 | | 0.9 | 22.4 | 0.2 | 0.5 | 1.1 | 2.2 | 3.9 |
| | 100.0 | 100.0 | 100.0 | 100.0 | 100.0 | 100.0 | 100.0 | 100.0 | 100.0 |

It is of considerable interest to note that, in view of the fact that hydrogen fluoride will react more readily with propylene than with ethylene under the conditions present in the depropanizer, even if free hydrogen fluoride should rise as high in the tower as to be present in one or more of the top five trays, the reaction of it with an olefin goes almost completely to the formation of propyl fluoride.

It will be appreciated that various modifications of my invention can be practiced, by one skilled in the art, without departing from the scope or spirit of the teachings and disclosure, and without departing from the scope of the claims.

I claim:

1. An improved process for reacting isobutane and low-boiling olefin hydrocarbons in the presence of a hydrogen fluoride catalyst, to produce higher-boiling paraffin hydrocarbons, which comprises reacting isobutane and a low-boiling olefin in a reaction zone in the presence of a hydrogen fluoride catalyst, separating from effluents of said reaction zone a liquid phase comprising primarily hydrogen fluoride catalyst and a liquid hydrocarbon phase comprising a minor amount of hydrogen fluoride, passing said hydrocarbon phase to a first fractional distillation means, removing from said means a high-boiling fraction substantially free from hydrogen fluoride comprising higher-boiling paraffin hydrocarbons produced in said reaction zone, removing also from said means a low-boiling fraction comprising isobutane and lower-boiling hydrocarbons and said hydrogen fluoride contained in said hydrocarbon phase, passing said low-boiling fraction to a second fractional distillation means, introducing also into said second means a propane-propylene mixture containing sufficient propylene to react with said hydrogen fluoride and form propyl fluoride, removing from said second means a low-boiling fraction which is substantially free from hydrogen fluoride and which comprises essentially hydrocarbons lower-boiling than isobutane and contains substantially all of the propane contained in said added propane-propylene mixture, removing also from said second means a high-boiling fraction comprising isobutane and propyl fluoride and substantially free from propane, and passing said high-boiling fraction from said second means to said reaction zone.

2. In a process for reacting isobutane with a low-boiling olefin in the presence of a hydrofluoric acid catalyst to produce higher-boiling paraffin hydrocarbons, the improvement which comprises passing liquid hydrocarbon effluents of such a reaction containing dissolved hydrogen fluoride to a first fractional distillation means, removing from said means as a low-boiling fraction substantially all of the isobutane and lighter hydrocarbons contained in said effluents together with said dissolved hydrogen fluoride, passing said lighter fraction to a second fractional distillation means, introducing also into said second distillation means a propane-propylene mixture containing sufficient propylene to react with said hydrogen fluoride and form propyl fluoride, removing from said second means a low-boiling fraction which is substantially free from hydrogen fluoride and which comprises essentially hydrocarbons lower-boiling than isobutane and contains substantially all of the propane contained in said added propane-propylene mixture, removing also from said second means a high-boiling fraction comprising isobutane and propyl fluoride and substantiallly free from propane, and passing said high-boiling fraction to an alkylation reaction zone.

3. An improved process for reacting isobutane and low-boiling olefin hydrocarbons in the presence of a hydrogen fluoride catalyst to produce higher-boiling paraffin hydrocarbons, which comprises reacting isobutane and a low-boiling olefin in a reaction zone in the presence of a hydrogen fluoride catalyst, separating from effluents of said reaction zone a liquid hydrocarbon phase comprising unreacted isobutane and paraffin hydrocarbon reaction products and containing dissolved hydrogen fluoride, passing said mixture to a first fractional distillation means and removing therefrom a low-boiling fraction comprising isobutane and lower-boiling hydrocarbons and essentially all hydrogen fluoride contained in said mixture, cooling and condensing said low-boiling fraction, returning to said reaction zone a portion of said condensed fraction including substantially all of the liquid hydrogen fluoride separating therefrom as a separate liquid phase, passing a further portion of said condensed fraction to a second fractional distillation means, introducing also into said second means a propane-propylene mixture containing sufficient propylene to react with said hydrogen fluoride and form propyl fluoride, removing from said second means a low-boiling fraction which is substantially free from hydrogen fluoride and which comprises essentially hydrocarbons lower boiling than isobutane and contains substantially all of the propane contained in said added propane-propylene mixture, removing also from said second means a high-boiling fraction comprising isobutane and propyl fluoride and substantially free from propane, and passing said high-boiling fraction to said reaction zone.

4. In a process for reacting a low-boiling isoparaffin hydrocarbon with an alkylating reactant to produce higher-boiling paraffin hydrocarbons, the improvement which comprises passing a liquid hydrocarbon material comprising low-boiling hydrocarbon effluents of such a reaction and containing dissolved hydrogen fluoride to a first fractional distillation means, removing from said means a low-boiling fraction comprising unreacted low-boiling isoparaffin reactant and lower-boiling hydrocarbons contained in said effluents together with dissolved hydrogen fluoride, passing said low-boiling fraction to a second fractional distillation means, introducing also in said second distillation means a propane-propylene mixture containing sufficient propylene to react with said hydrogen fluoride and form propyl fluoride, removing from said second means a low-boiling fraction which is substantially free from hydrogen fluoride and which comprises essentially hydrocarbons lower-boiling than said isoparaffin reactant and contains substantially all of the propane contained in said added propane-propylene mixture, removing also from said second means a high-boiling fraction comprising said isoparaffin reactant and propyl fluoride, and passing said high-boiling fraction to an alkylation reaction zone.

5. The process of claim 4 in which said low-boiling isoparaffin is isobutane and said alkylating reactant comprises a mixture of butylenes.

6. An improved process for reacting a low-boiling isoparaffin hydrocarbon with an alkylating reactant to produce high-boiling paraffin hydrocarbons in the presence of a hydrogen fluoride catalyst, which comprises reacting a low-boiling isoparaffin and an alkylating reactant in a reaction zone in the presence of a hydrogen fluoride catalyst, separating from effluents of said reaction zone a liquid hydrocarbon phase comprising unreacted isoparaffin and paraffin hydrocarbon reaction products and containing dissolved hydrogen fluoride, passing said mixture to a first fractional distillation means and removing therefrom a low-boiling fraction comprising unreacted isoparaffin and lower-boiling hydrocarbons and essentially all hydrogen fluoride contained in said mixture, cooling and condensing said low-boiling fraction, returning to said reaction zone a portion of said condensed fraction including substantially all of the liquid hydrogen fluoride separating therefrom as a seprate liquid phase, passing a further portion of said condensed fraction to a second fractional distillation means, introducing also into said second means an olefin hydrocarbon in an amount sufficient to react with hydrogen fluoride contained in said further portion of said condensed fraction and form alkyl fluoride, removing from said second means a low-boiling fraction which is substantially free from hydrogen fluoride and which comprises essentially hydrocarbons lower-boiling than said isoparaffin reactant, removing also from said second means a high-boiling fraction comprising said isoparaffin reactant and alkyl fluorides so produced, and passing said high-boiling fraction to said reaction zone.

CARL S. KELLEY.

REFERENCES CITED

The following references are of record in the file of this patent:

UNITED STATES PATENTS

| Number | Name | Date |
|---|---|---|
| 2,371,341 | Matuszak | Mar. 13, 1945 |
| 2,425,745 | Leonard et al. | Aug. 19, 1947 |